United States Patent [19]
Lantis et al.

[11] Patent Number: 5,396,977
[45] Date of Patent: Mar. 14, 1995

[54] CONVEYOR APPARATUS FOR DIRECTIONALLY CONTROLLED TRANSLATION OF AN ARTICLE

[75] Inventors: Bernard T. Lantis; Robert J. Notman, both of Salinas; Raymond L. Hickman, Gilroy; Robert C. Engholm, Seaside, all of Calif.

[73] Assignee: Lantis Corporation, Salinas, Calif.

[21] Appl. No.: 134,752

[22] Filed: Oct. 12, 1993

[51] Int. Cl.⁶ ............................................. B65G 47/46
[52] U.S. Cl. .................................. 198/371; 198/786; 198/787
[58] Field of Search ................... 198/786, 787, 371; 193/35 MD; 414/345, 347, 529

[56] References Cited

U.S. PATENT DOCUMENTS

| | | | |
|---|---|---|---|
| 3,679,043 | 7/1972 | Becker | 193/35 MD |
| 3,710,917 | 1/1973 | Black et al. | 193/35 MD |
| 4,981,209 | 1/1991 | Sogge | |
| 5,074,405 | 12/1991 | Magolske et al. | 193/35 MD |

FOREIGN PATENT DOCUMENTS 284220 1/1971 Russian Federation .

OTHER PUBLICATIONS

Control panel related to FMC Sogge patent.
Product brochure of the Lantis TLC 818.
First page of OEM Controls, Inc. Bulletin Oct. 1988.

*Primary Examiner*—Joseph E. Valenza
*Attorney, Agent, or Firm*—Flehr, Hohbach, Test, Albritton & Herbert

[57] ABSTRACT

A conveyor apparatus especially useful for loading a cargo airplane utilizes several parallel transverse and longitudinal shafts on which are fixed for rotation wheels which contain around their periphery rollers which have axes of rotation in a plane perpendicular to the shaft on which the wheel is mounted. The shafts are divided into appropriate zones and subzones to provide for longitudinal, transverse and rotary movement in two zones for the conveyor as a whole. Joystick type controllers with rocker switches provide for easy actuation of the above control directions.

9 Claims, 6 Drawing Sheets 5,396,977

CONVEYOR APPARATUS FOR DIRECTIONALLY CONTROLLED TRANSLATION OF AN ARTICLE

The present invention is directed to conveyor apparatus for directionally controlled translation of an article and more specifically to a pallet or container loader for an aircraft.

BACKGROUND OF THE INVENTION

Both U.S. Pat. No. 4,981,209 and the Russian Bazalii et al U.S. Pat. No. 284,220 show conveyors which are especially useful for aircraft loading where the pallet or article being translated on the conveyor can be moved on the conveyor left or right or rotated. However, in both of the foregoing conveyors, either the overall control is complex or difficult or the drive rollers are relatively inflexible or cause excessive friction. And additionally, in the case of the U.S. patent, stability of direction may be marginal under wet conditions or if the rollers are dirty or worn.

SUMMARY AND OBJECT OF THE INVENTION

It is therefore a general object of the present invention to provide an improved conveyor apparatus for directionally controlled translation of an article.

In accordance with the above object there is provided conveyor apparatus for directionally controlled translation of an article comprising a platform having forward and rear zones with a longitudinal axis between the zones and a transverse axis perpendicular to the longitudinal axis. First and second pairs of a plurality of parallel shafts are journaled on the platform in first and second zones respectively in a transverse direction. Third and fourth pairs of a plurality of parallel shafts are journaled on the platform in the first and second zones respectively in a longitudinal direction. A plurality of roller means are fixed for rotation with each of the shafts for supporting and translating the article, each of the roller means including a plurality of barrel shaped rollers around a periphery of the roller means, such barrel rollers being mounted for rotation on axes which are in a plane perpendicular to the shaft on which the roller means is fixed for rotation. Motor means independently drive each one of the shafts of each of shaft pairs. Control means coupled to the motor means provide for selectively driving the shafts of each of the shaft pairs, including a pair of joysticks with rocker switches integrated therein.

BRIEF DESCRIPTION OF THE PREFERRED EMBODIMENT

Figure 1:
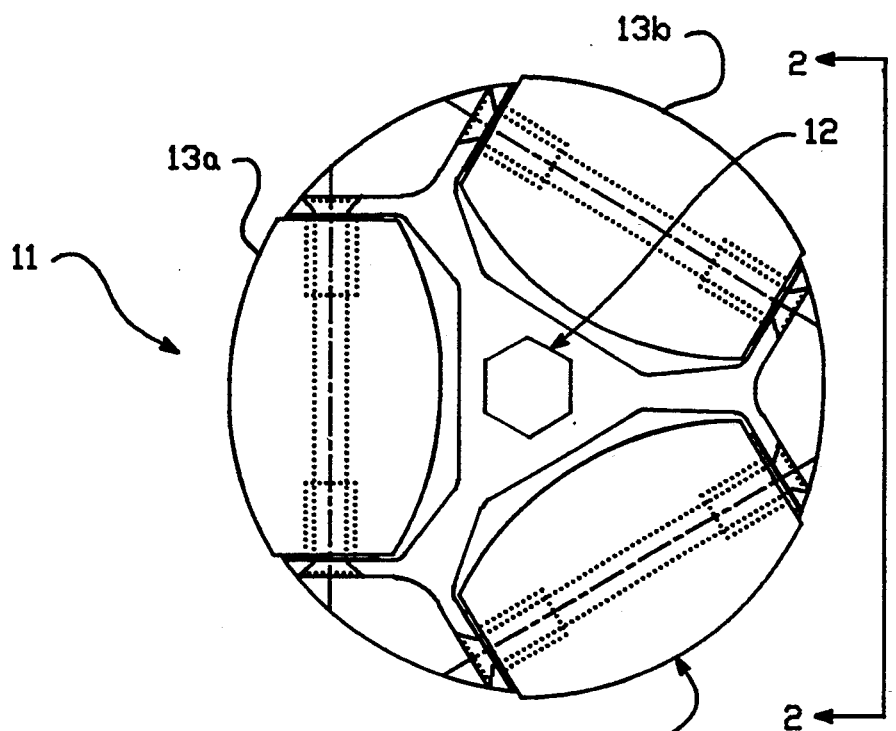
FIG. 1 is an elevational view of the basic wheel used in the present invention to translate an article.
Figure 2:
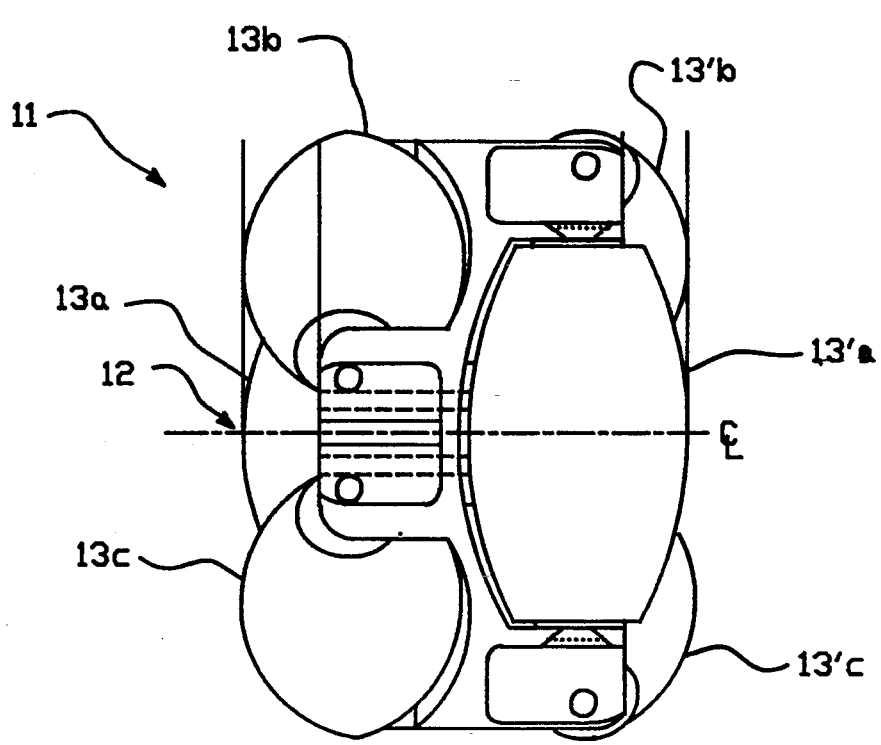
FIG. 2 is a side view taken along the line 2—2 of FIG. 1.

FIGS. 1 and 2 show a typical wheel 11 or roller means used for supporting and translating an article on a conveyor of the present invention. Wheel 11 is fixed for rotation with the shaft 12 and has three barrel-shaped rollers 13a, 13b and 13c. As shown in FIG. 2, there are actually nested pairs of the roller groups with additional rollers 13'a, 13'b and 13'c. The individual rollers 13 are rotated respectively 60° from one another so that when the wheel is supporting an article or container, a roller will always be in contact with the container during rotary movement therewith. The rollers 13 are mounted for rotation on axes which are in a plane perpendicular to the shaft 12. All of the foregoing is also shown in the above-mentioned Russian patent. Alternatively, rather than a nested pair, a single wheel with six rollers may provide improved stability.

Figure 3A:
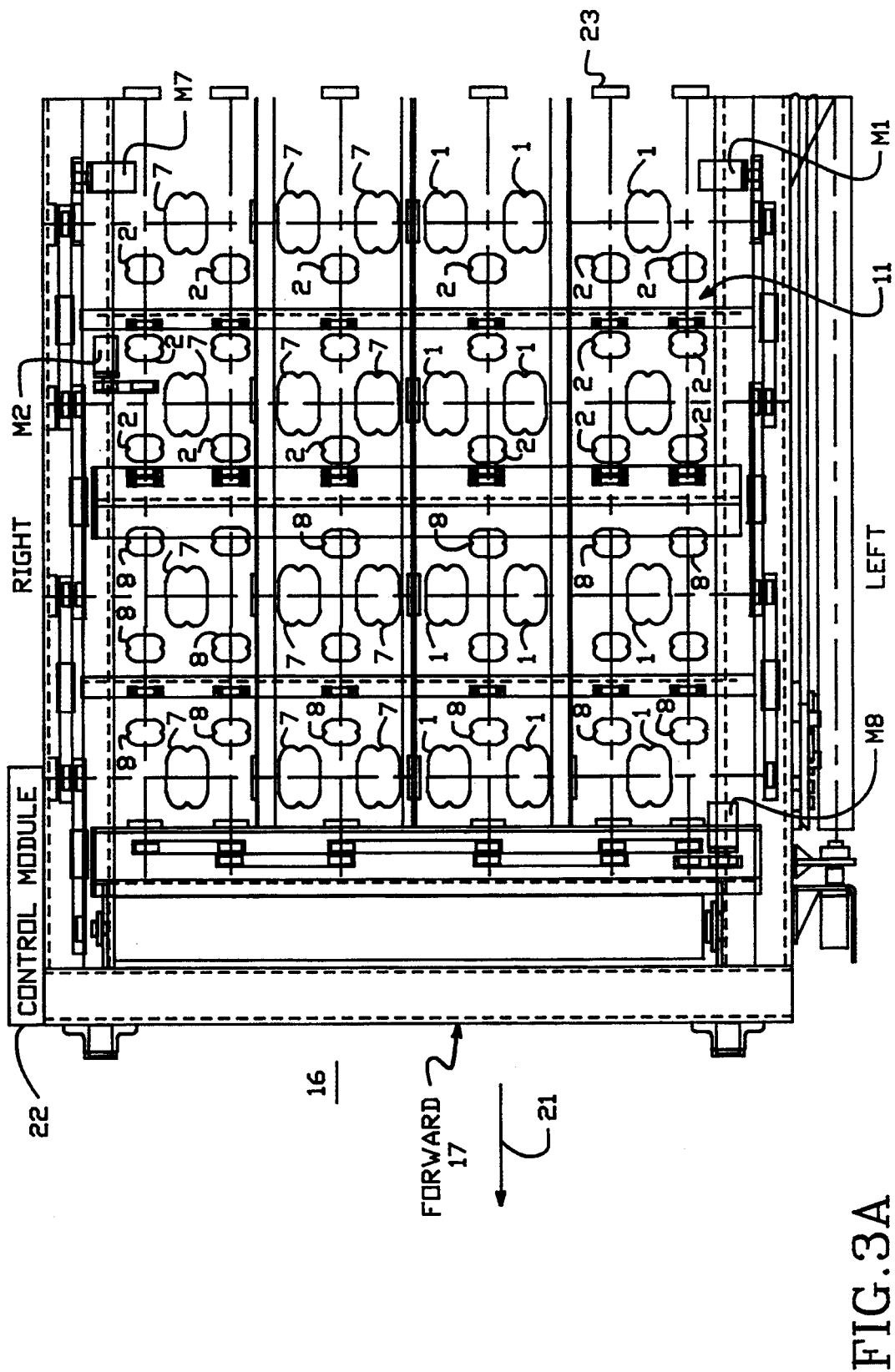
FIGS. 3A and 3B show a plan view of the conveyor apparatus of the present invention.
Figure 3B:
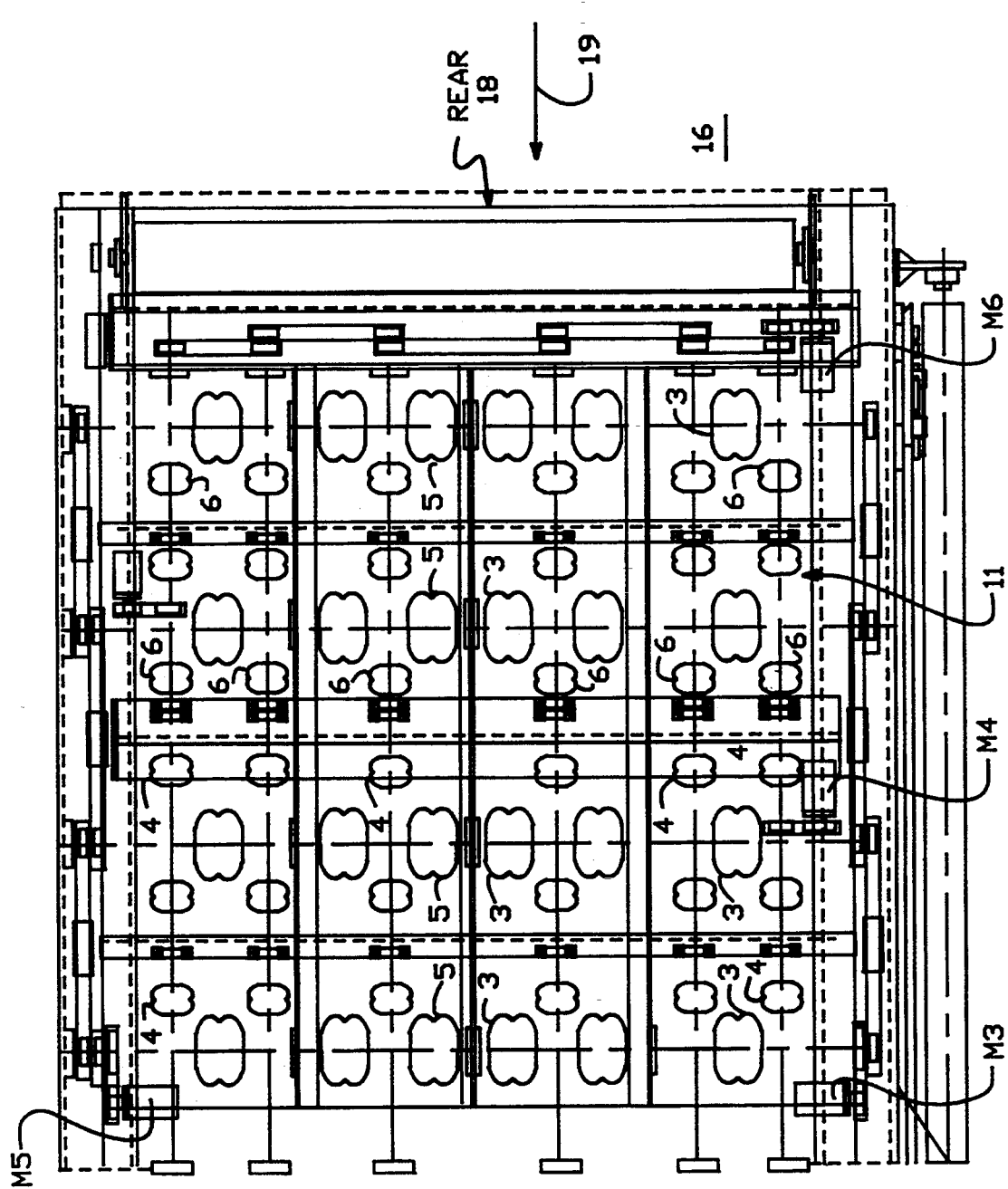

FIGS. 3A and 3B are a general layout of the conveyor with the platform 15 in which the wheels and their shafts are journaled, which includes a forward zone (or elevator) 17 and a rear zone 18. Thus the longitudinal direction of movement from the rear zone to the forward zone is indicated by the arrows 19 and 21. The transverse direction is of course perpendicular between the left and right sides of the platform so labeled. Thus the wheels 11 and their rollers 13 support an article or pallet which would normally be placed on the rear of the platform, moved to the forward portion and then into the, for example, cargo hatch of an airplane. The platform has attached to it a control module 22 where an operator actuates controls to translate the article across the conveyor so that it is loaded in the cargo hatch in the proper orientation.

Wheels 11 are fixed for rotation on shafts and these shafts are indicated by the dashed lines running through the wheels 11 with the wheel having the shaft legend indicated on it to clearly show which wheels are rotated by which shafts. Thus as illustrated in FIG. 3A, there are transverse shafts 1 and 7 independently journaled and longitudinal shafts 8 and 2. These shafts are each rotated in a group by the same numbered motors; viz., M1, M2, M7 and M8.

Figure 5A:
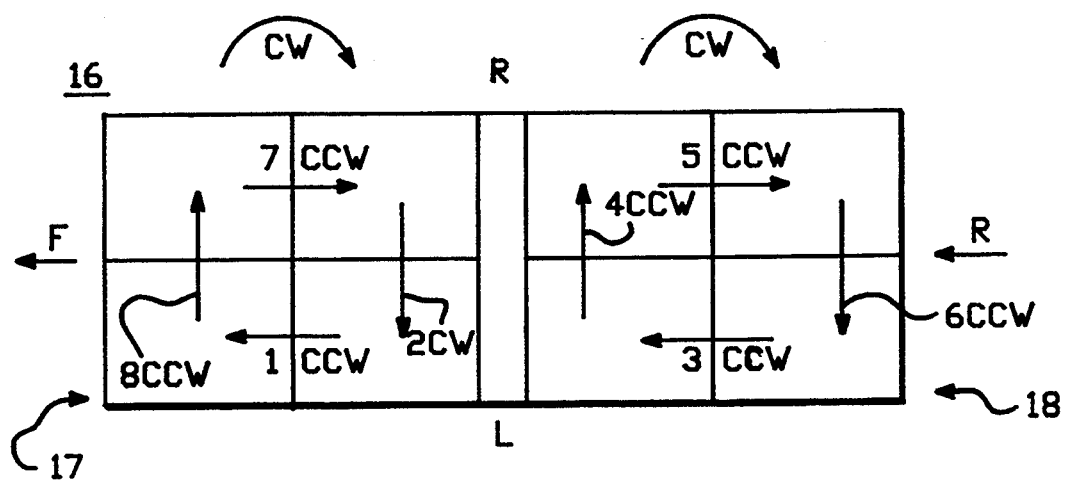
FIGS. 5A, 5B and 5C are diagrams illustrating the operation of the invention showing a diagrammatic view of the conveyor apparatus.

Referring to the diagram of FIG. 5A, this illustrates the platform 16 in diagrammatic form, the shaft and associated wheel directions being indicated by the identically numbered arrows along with the specific direction of rotation; that is, either clockwise or counterclockwise. Thus, referring to the forward zone 17 of FIG. 5A, shaft 8 and its wheels are rotated in a counterclockwise direction when the motor M8 is operated appropriately and so on. Thus the four motors M1, M2, M7, and M8 provide independent driving of the four groups of shafts. Two of the shaft groups provide for transverse movement, shafts 2 and 8, and the other provide for longitudinal movement of shafts 1 and 7. Each of the shaft groups illustrated in FIG. 3A contain a number of parallel shafts with there being four transverse journaled shafts and six longitudinally journaled shafts. It is believed that because the wheels 11 on the longitudinal shafts must necessarily be smaller to provide a cross over between shafts, that more wheels are necessary to provide a sufficient amount of friction.

Now referring to the rear elevator zone 18 of FIG. 3B and referring to FIG. 5A, there is the same layout with the transverse shafts 3 and 5 providing longitudinal movement and the longitudinal shafts 4 and 6 providing transverse movement. Again the motors for selectively driving these four different shaft groups are motors M3, M4, M5 and M6. All of the shafts of FIG. 3 are shown as being journaled in bearings, such as at 23.

The specific belt drive or chain linkages, for example, between the motor M1 and the four shafts which it drives, is only schematically indicated.

In summary with regard to the entire conveyor surface, first and second pairs of a plurality of parallel shafts are journaled on the platform, in the first and second zones, respectively, in a transverse direction. These are shafts 1, 7, 3 and 5. Then third and fourth pairs are journaled in the longitudinal direction; viz., 2, 8, 4 and 6.

Figure 4:
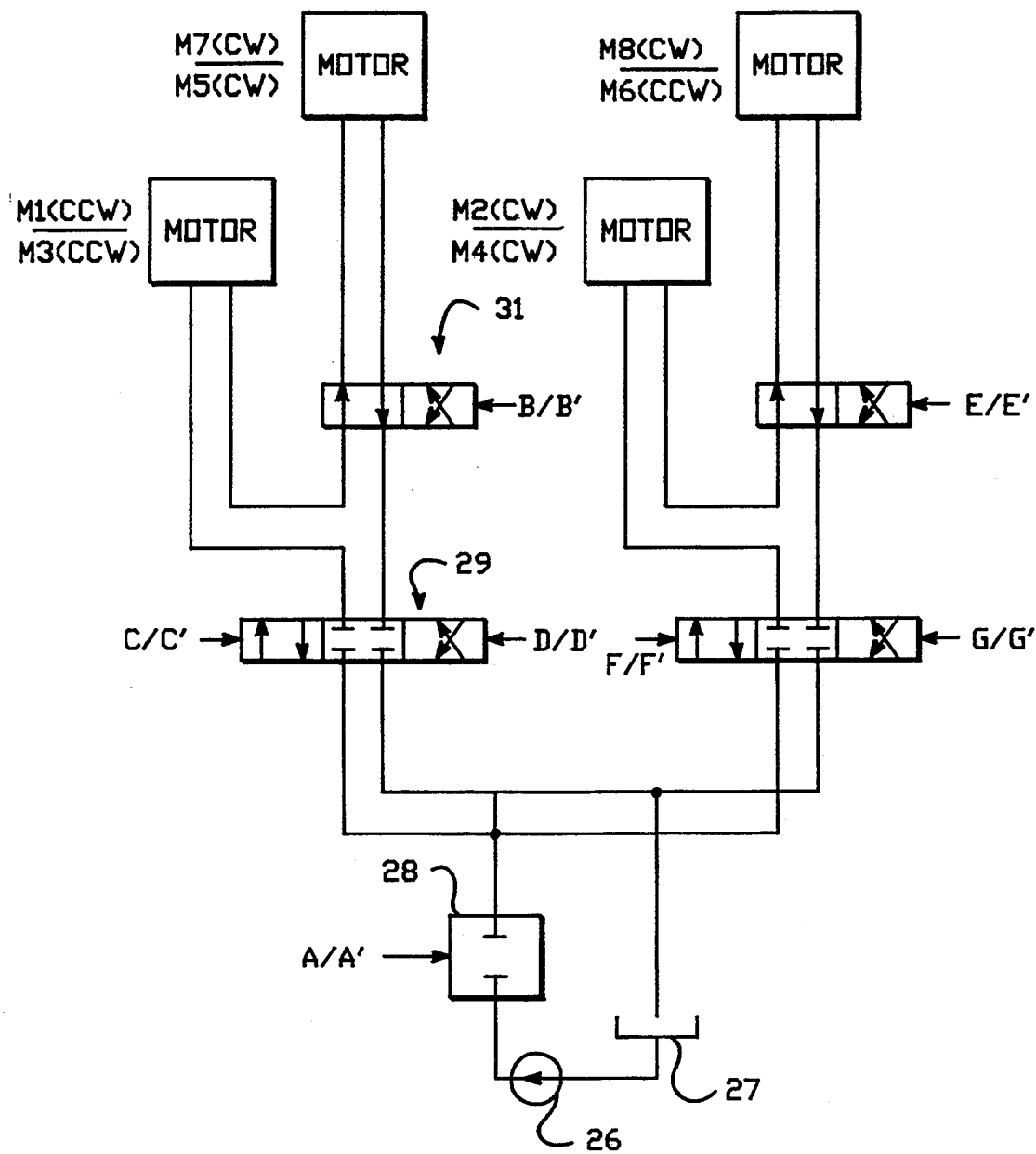
FIG. 4 is an electrical and hydraulic schematic of the motor system of the present invention.

FIG. 4 are illustrates the hydraulic and electrical control scheme for controlling the various motors. In the single FIG. 4 the control schemes both for the forward zone and the rear zone. While there are two separate sets of control systems in actuality, only one set is shown in FIG. 4 with the forward and rear zones being separated by a slash. Thus, four motors are illustrated which in the forward zone are motors M1, M2, M7 and M8. And then there are four additional motors in the rear zone which are M3, M4, M5 and M6. All of the motors are hydraulically driven by a pump 26 having an input reservoir 27 and a master valve 28 with the controlling input A/A'. The motors are interconnected by the hydraulic valves as schematically indicated with the remaining control inputs B,B' through G/G'.

A typical hydraulic valve is indicated at 29 where with the C/C' input there is a straight through connection but with a D/D' input reversal occurs in the hydraulic lines. The other type of valve is indicated at 31 where with no actuation there is a throughput and with the B/B' input energized a reversal. Thus the relative motor directions indicated are those with the normal (nonreversed) hydraulic connections.

With the appropriate energization of the hydraulic switch inputs, as illustrated in FIG. 4, the various motors can be actuated in either direction to provide a number of different translation functions. This is illustrated in the below Table I:

TABLE I

| Function | Motor Direction | | Energize |
|---|---|---|---|
| FORWARD | | | |
| Forward Convey | 1 CCW | 7 CW | A, C |
| Backward Convey | 1 CW | 7 CCW | A, D |
| Left Convey | 2 CW | 8 CW | A, F |
| Right Convey | 2 CCW | 8 CCW | A, G |
| Forward Elevator | 1 CCW | 2 CW | A, C, B, |
| Rotate CW | 7 CCW | 8 CCW | F, E |
| Forward Elevator | 1 CW | 2 CCW | A, D, B, |
| Rotate CCW | 7 CW | 8 CW | G, E |
| Pallet Rotate | 1 CCW | 2 CCW | A, C, B, |
| CW | 7 CCW | 8 CCW | G |
| Pallet Rotate | 1 CW | 2 CW | A, D, B, |
| CCW | 7 CW | 8 CW | F |
| REAR | | | |
| Forward Convey | 3 CCW | 5 CW | A', C' |
| Backward Convey | 3 CW | 5 CCW | A', D' |
| Left Convey | 4 CW | 6 CCW | A', F' |
| Right Convey | 4 CCW | 6 CW | A', G |
| Rear Elevator | 3 CCW | 4 CCW | A', C', B', |
| Rotate CW | 5 CCW | 6 CCW | G', E' |
| Rear Elevator | 3 CW | 4 CW | A', D', B', |
| Rotate CCW | 5 CW | 6 CW | F', E' |
| Pallet Rotate | 3 CCW | 4 CW | A', C', B', |
| CW | 5 CCW | 6 CCW | F' |
| Pallet Rotate | 3 CW | 4 CCW | A', D', B', |
| CCW | 5 CW | 6 CW | G' |

Referring to the Table, independent operation in both the forward and rear zones is provided for forward and backward convey, left and right convey, and to rotate an article individually on either the rear elevator or zone 18 or forward elevator or zone 17. Then a pallet lying across both zones can be rotated clockwise or counterclockwise by actuation of all of the appropriate motors in both zones.

Figure 5B:
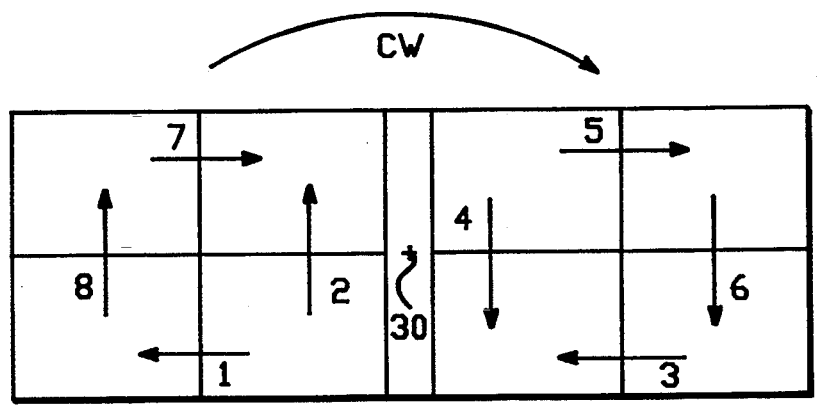
Figure 5C:
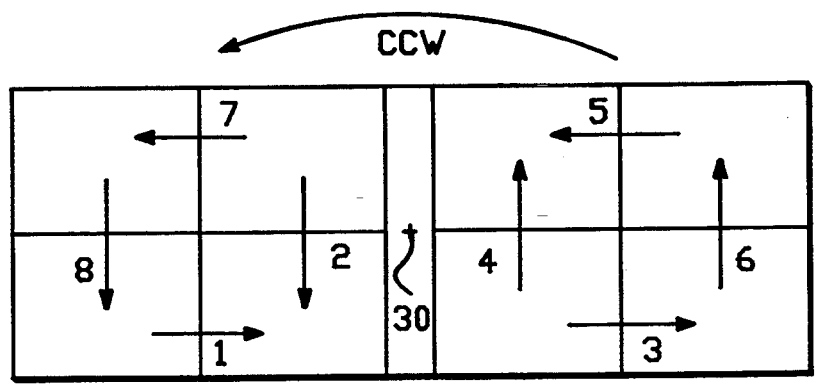

The above control maneuvers are shown in FIGS. 5A, 5B and 5C. The left and right and forward and backward convey commands are obvious. However, as illustrated in FIG. 5A, individual rotation in each of the zones is provided; that is forward elevator rotate or rear elevator rotate by rotating the drive wheels in the directions indicated. FIG. 5A illustrates a clockwise rotation for both forward and rear elevator with the motor directions being indicated by arrows corresponding exactly to that specified in Table I. Such rotation is provided by driving each of the shafts of each of the shaft pairs in opposite directions; that is shafts 8, 2 are driven in opposite directions as are shafts 1 and 7 to form a circle of common direction vectors in that zone; the same is true of the rear elevator zone. Then when rotation around a point between the zones, i.e., point 30 as shown in FIGS. 5B and 5C is desired, the individual shafts of shaft pairs 7, 1 and 5, 3 are driven in opposite directions to form in the combined two zones a circle of common direction vectors; and the individual shafts of shaft pairs 2 and 8 and 4 and 6 are driven in the same direction but with respect to each pair in opposite directions. With this type of drive, friction is minimized and great flexibility is achieved. However in order to provide for effective and simple energization of the various control inputs outlined in the above Table I, that is the control inputs A-G and A'-G', there must be a manual control input scheme which is intuitively simple to the operator.

Figure 7:
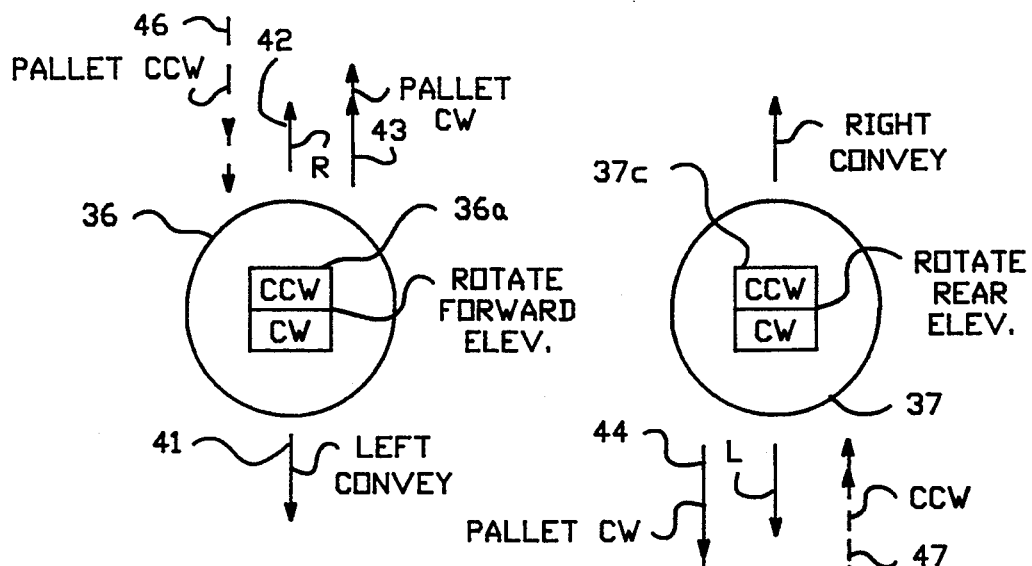
FIG. 7 is a top view taken along the line 7—7 of FIG. 6.
Figure 6:
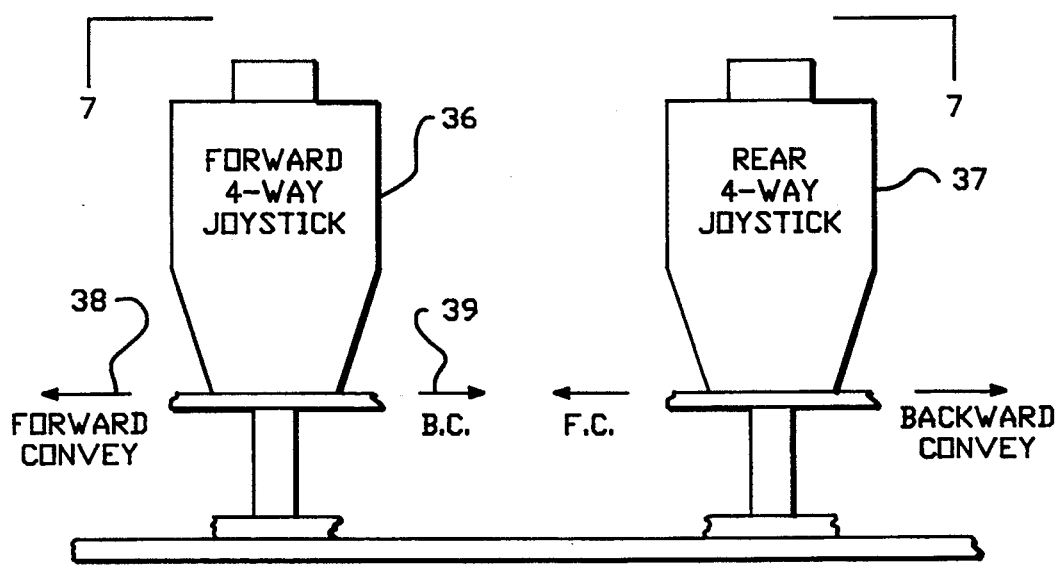
FIG. 6 is an elevational view of the control apparatus of the present invention.

As discussed above, such operator would be standing in the control module 22 as shown in FIG. 3A, for example, next to the cargo hatch of the airplane being loaded. Thus, as illustrated in FIG. 6, the invention provides for two four-way joysticks 36 and 37 with one joystick being for normal operation in the forward zone or elevator and joystick 37 for the rear zone. Thus as indicated by the arrows 38 and 39, movement of the joysticks to the left provides for forward conveying and to the right for backward conveying. And then for left and right convey as illustrated in FIG. 7, the joystick is moved in the other two positions as indicated by arrows 41 and 42. Thus each joystick has four operative positions of 0° to 90°, 180°, and 270°. When it is desired to individually forward elevator rotate or rear elevator rotate, rocker switches 36a and 37a are utilized which are mounted for actuation in the top faces of the respective joysticks 36 and 37. As indicated on the drawing of FIG. 7, each rocker switch provides a clockwise or counterclockwise actuation which provides for the rotation indicated in FIG. 5A. The joystick and rocker switch illustrated in FIGS. 6 and 7 are commercially available as a unit from OEM Controls, Inc. of Sheldon, Conn.

Continuing to refer to Table I, the last control action which must be achieved is the pallet rotation control. This is accomplished by movement of the joysticks 36 and 37 to the 0° and 180° operative positions concurrently. As illustrated by the double headed arrows to provide for movement of the pallet in a clockwise direction, the solid arrows 43 and 44 indicate joystick direction and for the reverse direction dashed arrows 46 and 47. When these control actions are initiated by the operator, the motor shafts are driven in their respective directions as illustrated in FIGS. 5B and 5C.

Figure 8:
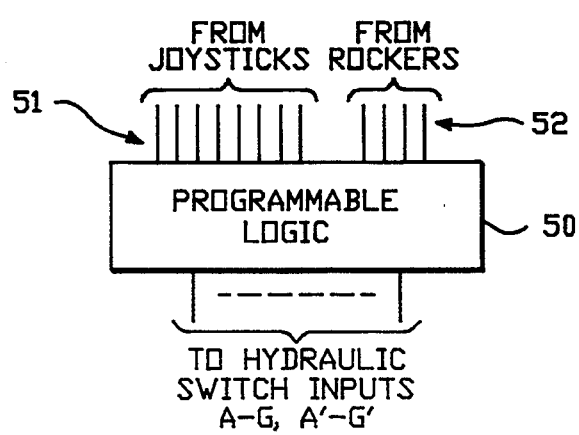
FIG. 8 is a circuit schematic showing the operation of the present invention.

The hydraulic motors are energized by the appropriate inputs to the hydraulic switches A-G, A'-G'. FIG. 8 illustrates a programmable logic unit 50 which receives the electrical switch inputs from the joysticks indicated by the eight lines 51 and the switch inputs from the rocker switches by the four lines 52. Programmable logic unit 50 is programmed utilizing Table I as a truth table.

Thus an improved conveyor apparatus has been provided which provides better directional stability either longitudinally or laterally. The system is less dependent on friction to drive the load in the desired direction, and, even in the event of failed rollers, will work in rainy and/or oily conditions. Functionally, the apparatus will perform better when encountering cargo load devices with defective or warped bases. It will also consistently perform better when handling load devices which have an uneven load distribution (heavy areas and light areas on the same load device).

What is claimed is:

1. Conveyor apparatus for directionally controlled translation of an article comprising:
   a platform having forward and rear zones with a longitudinal axis between said zones and a transverse axis perpendicular to said longitudinal axis;
   first and second pairs of a plurality of parallel shafts journaled on said platform in said forward and rear zones respectively in said transverse direction;
   third and fourth pairs of a plurality of parallel shafts journaled on said platform in said forward and rear zones respectively in said longitudinal direction;
   a plurality of roller means fixed for rotation with each of said shafts for supporting and translating said article, each of said roller means including a plurality of barrel shaped rollers around a periphery of said roller means, such barrel rollers being mounted for rotation on axes which are in a plane perpendicular to said shaft on which said roller means is fixed for rotation;
   motor means for independently driving each one of said shafts of each said shaft pairs;
   control means coupled to said motor means for selectively driving said shafts of each of said shaft pairs including a pair of joy sticks with rocker switches integrated therein; said rocker switches respectively providing for clockwise sand counterclockwise rotating of a said article in each of said zones and said pair of joy sticks providing for clockwise and counterclockwise rotation around a point between said zones.

2. Conveyor apparatus as in claim 1 where each of said roller means includes a nested pair of said barrel shaped rollers angularly displaced from one another with respect to the rotation of the shaft on which the roller means is fixed.

3. Conveyor apparatus as in claim 1 where rotation in each of said zones is provided by driving each of the shafts of each of said shaft pairs in opposite directions.

4. Conveyor apparatus as in claim 1 where rotation of a said article around a point between said zones is provided by driving each of the shafts of each of said first and second shaft pairs in opposition directions and each of said shafts of each of said third and fourth shaft pairs in the same directions but with respect to each pair in opposite directions.

5. Conveyor apparatus as in claim 1 where said joysticks have only four operative positions of 0°, 90°, 180°, and 270° and where said rotation around said point between zones is provided by movement of the two joysticks to the 0° and 180° operative positions concurrently.

6. Conveyor apparatus as in claim 1 where each of said joysticks includes a cylindrical handle with a top face which includes a said rocker switch.

7. Conveyor apparatus as in claims 1 or 5 where said joysticks respectively provide for transverse and longitudinal translation in each of said zones.

8. Conveyor apparatus as in claim 1 where said longitudinally journaled shafts include roller means with relatively smaller diameters to allow said transverse journaled shafts to cross over.

9. Conveyor apparatus as in claim 8 where there are a greater number of said longitudinally journaled shafts.

* * * * *